Patented Dec. 14, 1948

2,455,921

UNITED STATES PATENT OFFICE 2,455,921

METHOD OF MAKING A PLASTIC CORK COMPOSITION

Josef Ehrlich, New York, N. Y., assignor to Erko Corporation, New York, N. Y., a corporation of New York No Drawing. Application October 4, 1943, Serial No. 504,963

6 Claims. (Cl. 106—149)

My invention relates to a new and improved binding composition, to new and improved masses which are made with the use of said binding composition, and to a new and improved method of curing or setting said binding composition.

The materials which can be connected by means of said binder include cork, leather, and fibers or flocks and mixtures thereof, and all other materials. Said materials may be in the form of particles, sheets, and in any other form or shape. The materials which are bound by means of said binder can be of any kind, including fibers of wool, silk, cotton, and other textile and non-textile materials.

Another object of my invention is to use zein, as a solute in a binding composition, whose solvent is not evaporated after the binding composition has been applied.

Another object of my invention is to provide a binding composition in which zein is dissolved in ethylene glycol or other substance, the proportion of zein being at least 22% by weight of the weight of the binding composition. I prefer to have more than 22% by weight of zein in the composition, based upon the total weight of the binding composition as more fully stated in the illustrative examples.

The ethylene glycol and diethylene glycol, triethylene glycol, propylene glycol, etc. are examples of plasticizing solvents for the zein, the boiling points of said plasticizing solvents being sufficiently high so that they do not evaporate at ordinary room temperatures.

Another object of my invention is to provide a binding composition which is a thick or viscous liquid at ordinary room temperature of about 25° C. Such viscous liquid can be easily and rapidly heated until it can be readily mixed with a solid filler, such as cork, leather, etc. in an ordinary mixing machine. In order to use said thick liquid in an ordinary mixing machine, it is necessary to heat the same only to a moderate temperature of about 35° C.–50° C. For some purposes, this thick viscous liquid binder can be used directly at ordinary room temperature of about 25° C. For other purposes said thick liquid is heated to 35° C.–50° C. For other purposes, said thick liquid is thinned with about 15% of methanol, in order to thin said thick liquid sufficiently so that it can be intermixed with fine solid granules and for other purposes, at ordinary room temperature of about 25° C. Instead of using methanol, I can use other solvents for the zein, or other diluents which need not be solvents for the zein. Such added solvent or diluent is volatile so that it evaporates from the binding composition, while the plasticizing solvent which has a high boiling point, remains in the binding composition.

When the improved binding composition is intermixed with fine or coarse granules of cork, leather, or the like, such granules adsorb the binding composition so that the binding composition is retained, even when the mixture of the binding composition and of the solid granules is subjected to pressure.

The basic ingredients of the improved binding composition are a plasticizing solvent for the zein, in which a sufficient proportion of zein has been dissolved. In addition to this basic formula, the binding composition may also contain one or more phenols which will react with the formaldehyde which is used to coagulate the zein in the basic binding composition. According to my invention, such formaldehyde is formed or generated during the operation of curing the binding composition, instead of adding previously prepared formaldehyde to the binding composition.

I thus form thermosetting phenol-formaldehyde resins in situ in the binding composition, while the zein is cured by the formaldehyde. By controlling the percentage of resin which is thus formed in situ, I can control the physical properties of the cured binding composition such as flexibility, hardness, resistance to heat and to oil and water, etc. Prior to the reaction with the formaldehyde, the phenol or phenols also act as a stabilizer or inhibitor, to prevent premature coagulation of the zein, and to prevent the gelation of the zein. Such gelation sometimes occurs, even if the zein does not contact with formaldehyde.

Numerous additional and important objects and advantages of my invention will be set forth in the following description.

The invention is illustrated, as one example, in connection with the binding of cork particles, in order to make sheets, stoppers, gaskets, etc.

Hitherto, in making a cork mass by cementing cork particles to each other by a binding composition, the usual practice has been to use a binder or adhesive, whose major component was glue, casein, and/or various synthetic resins.

Glue binders are usually solutions or hot melts of glue in glycerin. In using such a binder, a substance is added to such binder, which yields formaldehyde, during the curing or setting of the adhesive. This formaldehyde cures the respective protein, such as glue. The added substance which has thus been utilized to produce formaldehyde to set or cure the glue is paraformaldehyde or hexamethylene tetramine. Such additional substance has been added to the binder, according to prior practice, immediately prior to the admixture of the binder with the cork granules. It is also known to mix the cork granules with the binder, in order to coat the granules with the binder, and then to intermix the coated granules with such additional formaldehyde-yielding substance.

In prior practice, it was necessary to cure the binder immediately after the admixture thereof with such additional substance, as there was always an evolution of some formaldehyde. As soon as the binder contacts with said additional substance, proteins, such as glue, casein, etc., are rapidly coagulated by even small traces of formaldehyde. Glue binders cause considerable shrinkage of cork, so that glue-cork compositions cannot be used in making gaskets and other bodies, in which accurate size is required.

Resin binders, such as thermosetting resins, etc., have the disadvantage of changing with age.

Glue binders and resin binders must be liquefied by careful heating which usually requires several hours, before they can be intermixed with the cork granules. If resin binders are used in the form of solutions, the solvent must be evaporated, after the solution of the resin binder has been intermixed with the cork granules. Such glue binders cannot be shipped or stored in a stable finished form, which includes formaldehyde.

I eliminate these disadvantages by using a properly prepared zein binding composition. Zein is a protein which is derived from corn. It is preferably free from cystine, lysine, and tryptophan. It has resinous properties, and it can be dispersed in water by using neutral sulfonated castor oil. It is soluble in dilute ethyl or methyl alcohol, and it is insoluble in water, anhydrous ethyl or methyl alcohol, turpentine, esters, oils and fats. It is also insoluble in dilute acids.

I produce a zein binder composition which is a heavy and viscous liquid at ordinary room temperature of 25° C., by dissolving the zein in a solvent plasticizer which has a high boiling point, so that said solvent plasticizer is substantially or wholly non-volatile at about 25° C., and at normal pressure of 760 mm. of mercury. This solvent is also substantially non-volatile at the curing temperature. This solvent plasticizer remains in the cork mass or body.

Thus dissolved, zein cures with formaldehyde very slowly, at ordinary room temperature of about 25° C. At said ordinary room temperature, zein which is dissolved in such solvent plasticizer does not cure or harden with paraldehyde. The formula of paraldehyde is $C_6H_{12}O_3$. It is also designated as para-acetaldehyde, and as 2,4,6-trimethyl-1,3,5-trioxane. Hence, I can intermix a solution or dispersion of zein in a suitable solvent, with paraldehyde, and store the mixture at suitable low temperature for a considerable period of time, without coagulating the zein.

The improved zein binding composition increases the resilience and flexibility and tensile strength of bodies made of connected cork granules, in comparison with glue and resin binders. In addition, the improved zein binding composition is substantially free from shrinkage when it is cured and during the curing operation, and it is not affected by ageing. I can also control the curing of the zein in the binder composition, in order to vary and control the tensile strength, hardness and resilience of the finished body. This can be done by controlling the period and/ or temperature of the curing. By increasing the curing period and/or temperature, I can increase the resistance of the cork body to various chemical agents, and I can make cork masses which are unaffected by boiling in water and in many oils for many hours. The improved cork masses have great resistance to the mineral oils and to straight chain hydrocarbons and aromatic hydrocarbons. If the zein binder composition is properly cured, such cork bodies do not swell even when boiled in water. Boiling the cork bodies in dilute mineral acids for a short period even improves their mechanical properties.

If fine granules or dust of cork, leather, etc. are to be mixed with the zein binder composition, it is desirable to decrease the viscosity of such binder composition. I can secure this result, by dispersing zein powder of fairly large particle size in the solvent plasticizer. The particles of zein powder can correspond to about No. 20 mesh, namely, to a particle size of about 0.03 inch. A fairly fluid binding composition can thus be secured. The viscosity of the zein binder composition can also be diminished by heating said binder composition to about 40° C.–60° C. I can also dilute said binder composition with a volatile solvent for the zein, such as a suitable dilute alcohol, or with a diluent or thinner which does not dissolve the zein. If the diluting solvent is a lower aliphatic alcohol, such as methanol or ethanol, such diluting solvent must be evaporated before curing, because such alcohols prevent the formaldehyde from hardening the zein.

I can use paraldehyde as a diluent. In such case, it is not necessary to remove the paraldehyde, before curing. Paraldehyde has a boiling point of 124.4° C. at a pressure of 752 mm. of mercury. Hence, during the curing, some of the paraldehyde will evaporate, and some will decompose to yield formaldehyde, which will cure the zein. In order to produce acetaldehyde by heating paraldehyde, the presence of a small amount of water is necessary.

In order to make the zein binding composition I can use diethylene glycol as a solvent plasticizer. I can also use ethylene glycol, or triethylene glycol or propylene glycol, and other substances. The formula of ethylene glycol is $CH_2OHCH_2OH$. It has a boiling point of 197.37° C. The formula of diethylene glycol is $CH_2OHCH_2OCH_2CH_2OH$. It has a boiling point of 244.5° C. Diethylene glycol is also designated as dihydroxy-diethylether. Glycerol is not suitable for the purposes of my invention as the solvent. A solvent plasticizer which has a boiling point of at least 170° C. is particularly useful in plasticizing cork, when the binder is used to connect compressed cork particles in abutting relation.

The glycols are hygroscopic, and they absorb some water from the atmosphere, while the selected glycol is mixed with the cork granules. This usually provides enough water to cause the paraldehyde to produce the desired acetaldehyde. The curing agents for the zein are selected from a class which consists of aldehydes and their derivatives.

I have found that an improved cork body is produced, if the cork particles are sprayed with water, after said cork particles have been coated with the binding composition. The weight of the added water should preferably be about 6% of the weight of the cork granules. Such sprayed water acts to coagulate the zein. In making a cork body, it is desirable to have no water in the binder. Such water delays the curing. If the water is not completely evaporated, the cork body is injuriously affected. However, by spraying the cork particles after they have been coated with the binder, improved results are secured.

Immediately after thus wetting the cork granules, they should be packed under suitable pressure into the mold, and the curing is preferably immediately carried out. The invention is not limited to wetting the cork particles with water, after said cork particles have been coated with the zein binder composition.

*Example 1*

In order to bind particles of cork, the binder composition may consist of 33% of zein, 7% of paraldehyde, and 60% of diethylene glycol. These proportions are by weight.

The zein is preferably first dissolved in the diethylene glycol at about 25° C., to produce a uniform composition, and the paraldehyde is then added to said composition at about 25° C., in order to make the finished zein binder composition. Due to heat generated by mixing, I can make the composition at about 40° C.-50° C. The finished binder composition is uniform throughout.

This finished binder composition is stable for long periods, when kept at about 25° C., or at even a higher temperature, if said temperature is sufficiently low to prevent any substantial production of acetaldehyde.

In order to make a connected cork body or mass, I use coarse cork granules, whose size is about 3-6 mm., corresponding to No. 6 mesh. I uniformly mix one part by weight of said finished binder composition, with three parts by weight of said cork granules. The proportion may be one to one, one to four, etc. The coatings of the cork granules are then sprayed with water. The weight of the sprayed water is about 6% of the weight of the cork granules. The distribution of the water on the cork granules should be uniform. The cork particles are uniformly coated with the binder composition, before spraying the coatings with water.

As an example, in order to make a cylindrical rod of one inch diameter, with the use of the binding composition stated in Example 2, which is later stated herein, said cork granules are promptly packed into a cylindrical mold of said diameter, the interior wall of said mold having previously been oiled. The cork granules are immediately compressed in said mold, to about ⅓ of their original volume. While the cork granules are thus held compressed, the mold is put into an oven, in which the zein in the binding composition is cured by the developed formaldehyde at 120° C., for a period of about twenty minutes. I can cure at 110° C., by increasing the period of curing to thirty minutes. I can also shorten the curing period to ten minutes by using a curing temperature of 140° C., and I can shorten the curing period to five minutes, by using a curing temperature of 150° C. The cork granules are held under pressure to the desired final size, during the curing of the zein. There is little or no escape of water vapor. In making said cork rod with the composition of Example 1, I can use a minimum curing temperature of 140° C., and a minimum curing period of fifty minutes. I can also accelerate the curing by using catalysts or accelerators in the composition, such as hydrochloric acid, ammonia, ammonium thiocynate, etc.

The shortening of the curing period is important, if the zein in the cork body is not cured, in enclosed molds. I can thus make the cork body by an extrusion method.

In working at lower curing temperatures, below 120° C., it is advisable to disperse some paraformaldehyde in the finished binding composition, in addition to the paraldehyde.

*Example 2*

The finished binding composition consists of 33% of zein, 3% paraformaldehyde, 4% paraldehyde, and 60% diethylene glycol.

Said proportions are by weight, as in all the examples and illustrations stated herein.

The compositions stated in Examples 1 and 2 can be diluted or extended by ten additional parts of paraldehyde. Thus, Example 2 can be modified so that it will consist of 33 parts of zein, 3 parts of paraformaldehyde, 9-14 parts of paraldehyde, and 60 parts of diethylene glycol. Adding too much paraldehyde may cause separation of the ingredients of the finished binding composition.

*Example 3*

The binding composition consists essentially of 50 parts of ethylene glycol, 35 parts of zein, and 15 parts of "Santolite MHP". This is cured at about 125° C.

The mixture of said three ingredients is diluted with 50 parts of methanol, so that the weight of the methanol is equal to the weight of the ethylene glycol. The "Santolites" are described on page 563 of the 1942 edition of "The Condensed Chemical Dictionary" published by Reinhold Publishing Company.

The "Santolites" are aryl sulfonamide-formaldehyde resins. The "Santolite MHP" consists of clear, hard, nearly colorless resinous lumps. Its softening point is 62° C. When heated, this resin yields formaldehyde. It also acts as a modifier.

"Santolite" is toluene sulfonamide formaldehyde.

*Example 4*

The binding composition consists of 33% zein, 64% diethylene glycol, 3% paraformaldehyde. The advantage of using zein in said solution is that it has little sensitivity at about 25° C., as distinguished from other proteins. Hence said binding composition is stable at about 25° C. and even a little above, as high as 50° C. In this composition the paraformaldehyde begins to yield formaldehyde at about 65° C. Such composition can be cured at a low temperature of about 110° C.

Cork bodies which have a zein binder, can be cured by means of the alternating dielectric stresses which are produced by ultra-short electric waves, whose wavelength is about 6 meters. For this purpose, the ends of the cork body are located between and in contact with spaced electrodes, to which the terminals of the source of high-frequency alternating current are respectively connected. Such alternating dielectric stresses produce the internal heat which is required for curing the zein in the presence of formaldehyde.

Hence, I can use any of the above-mentioned four finished zein compositions, in order to bind cork granules, and I can cure by the zein in said composition by means of alternating dielectric stresses of high frequency.

Such curing is not easy, because there is a large phase angle between the applied alternating voltage, and the alternating current which produces said alternating dielectric stresses in the cork body.

By adding water by spraying or otherwise, I materially accelerate such curing of the binding composition, when short waves are used because I diminish the phase angle.

Instead of moistening the coatings of the cork particles with water, I can moisten said cork particles with a weak aqueous acid. For example, I can add to water, from 5% to 8% by weight of concentrated hydrochloric acid which has a specific gravity of 1.19. This provides the necessary weak acid.

Using said weak aqueous solution of hydrochloric acid, in combination with any of said finished binding compositions, I can cure the zein in the binder composition in a few seconds, using a source of alternating current of two kilowatts and having a wave length of six meters. The invention is not limited to the use of this wave length.

I can make a solid mixture of 75% of leather dust and 25% cork dust, intermix said solid mixture with 53 parts of the binding composition of Example 2, and cure for one hour at 125° C. The resultant body can be used as a gasket, as the heel of a shoe in place of a rubber heel, in shock absorbers, and for many other purposes.

Example 5

A body can be made of sufficient hardness, to be used as the sole or heel of a shoe, and for other purposes.

The finished binding composition consists of 40% of zein, 53% diethylene glycol, 4% paraldehyde, and 3% of paraformaldehyde.

A solid filler mixture is made of 65% of leather dust, 25% of fine cork granules, and 15% of suitable fibers, such as sisal waste.

Forty-five parts of said finished binding composition are heated to 55° C., and the binding composition is intermixed at said temperature of 55° C., with fifty-five parts of said solid mixture. The resultant body is cured at 125° C., during a period of 50 minutes.

Heretofore, zein has not been used commercially as a binder for cork and many other absorbent materials. When zein is dissolved in an ethyl alcohol-water mixture which contains about 94% of alcohol, the properties of the zein change after a certain lapse of time.

The invention is not limited to the illustrative examples.

The invention generally includes a solution or dispersion of zein in a dihydroxy alcohol, whose boiling point is above the curing temperature of zein, when exposed to formaldehyde, irrespective of other ingredients. It also includes such solution or dispersion, intermixed with paraldehyde, especially if the paraldehyde yields enough formaldehyde to cure the zein, irrespective of other ingredients.

Generally speaking, numerous changes and omissions and additions can be made in the examples and method of manufacture stated herein, without departing from the scope of the invention.

One of the advantages of my invention is that the zein binder composition can be made and applied at ordinary room temperature of 25° C., or at a very moderate elevated temperature of 40° C.–60° C. This is particularly advantageous when the zein binding composition is applied in a mixing machine. The composition is sufficiently fluid, and it has enough body, so that it can be intermixed with solid granules, fibers, etc. at 40° C.–60° C. by means of ordinary machines. If cork sheets or particles are connected by the improved composition, there is little or no absorption of the zein by the cork. There is some adsorption of the ethylene glycol or the like by the cork, so that I put into the original composition, more of the glycol than is required to plasticize the zein. If more absorbent filler materials are used, there may be some absorption, and the invention is not limited to the degree of absorption.

While I believe that the zein is truly dissolved in the plasticizing dihydric alcohol, it may be in the form of a fine dispersion, or in a colloidal state which is included when I refer to a solution.

If the binding composition is cured, without being intermixed with a solid filler, such as cork or the like, the glycol can be readily forced out of the cured composition by means of pressure. That is, all of the plasticizing glycol which was originally in the mixture will not be retained if the final composition is subjected to pressure. However, if the binding composition is intermixed with a suitable proportion of solid filler, such as cork or other suitable solid filler, the glycol is retained after the zein has been cured. This is due to the fact that the filler absorbs or adsorbs the excess of plasticizer which would otherwise be forced out by pressure. If the filling material is cork, the ethylene glycol or the like plasticizes the cork filler itself. The same effect is secured with other fillers.

In Examples 1, 2, 4 and 5, the percentage of zein varies from 33% to 40%, the percentage of paraldehyde varies from 3% to 7%, and the percentage of either ethylene glycol or diethylene glycol varies from 53% to 60%. When paraformaldehyde is used as an optional ingredient, it is used in a proportion of about 3%. In Example 3, the "Santolite" is an ingredient which is equivalent to the paraldehyde.

The improved compositions are substantially free from water. The composition of Example 3 is wholly free from water. The other compositions take up just enough water to act as a catalyst to decompose the paraldehyde to acetaldehyde, when this is used.

However, the percentage of zein may be as low as 24% of the weight of the entire composition.

The percentage of zein may be more than 40% so that the invention is not limited to an upper limit.

Another valuable feature of my invention is to provide the binding composition with a thermoplastic resin. Since such thermoplastic resins do not cure or set, when heated, the use of a thermoplastic resin is advantageous because the mixed binding composition and the filler becomes more flexible, when heated.

An example of the use of a thermoplastic resin is as follows:

Example 6

| | Parts |
|---|---|
| 50% polyvinylacetate solution in methanol | 25 |
| 75 parts of binder containing: | |
|     Methanol | 15 |
|     Diethylene glycol | 51 |
|     Zein | 28 |
|     Paraldehyde | 6 |
|     Paraformaldehyde | 3 |

The binding composition of Example 6 can be mixed in suitable proportion with cork particles or granules, leather particles or granules, or other suitable solid filling material. This composition cures at 120° C.–140° C.

The polyvinyl compounds increase the adhesion effect. Cured mixtures made with the use of the formula of Example 6 can be used for making the soles of shoes. Such a sole will increase in flexibility while the user is walking, due to the increased heat of the body.

It could not be foreseen that polyvinylacetate would be compatible in this compound because it is generally known that polyvinylacetate is incompatible with glycols.

As examples of binding compositions which include thermosetting resins, such as phenolaldehyde resins, the following are stated:

*Example 7*

| | Parts |
|---|---|
| Diethylene glycol | 53 |
| Zein | 30 |
| Phenol | 9.5 |
| Paraldehyde | 4 |
| Paraformaldehyde | 3 |
| Sodium hydroxide | ½ |

This cures at 150° C.

*Example 8*

| | Parts |
|---|---|
| Zein | 30 |
| Phenol | 24 |
| Diethylene glycol | 40 |
| Paraldehyde | 5 |
| Sodium hydroxide | 1 |

This cures at 150° C.

In all the examples stated herein, the cured zein is uniformly dispersed or distributed throughout the composition.

By the use of a composition made according to Example 1, intermixed with 3 parts by weight of cork granules, I can mark a sheet cork whose tensile strength is 172–190 pounds per square inch, having a shrinkage of only 0.27% during curing, and whose volume is reduced 36.2% by compression under 100 pounds per square inch. Upon being released from such pressure, the volume of the sheet of cork regains 90% of its original volume. Such sheet cork does not disintegrate upon boiling in water at 100° C. for 2 hours. The weight of such cork sheet is about 20.2 lbs. per cubic foot. Such a mixture of binding composition and cork filler is particularly advantageous in making gaskets, and for many other purposes.

Using a binding composition according to Example 2, with enough cork filler to produce a cork sheet whose weight is 19.1 lbs., a cured sheet which had been artificially aged for 72 hours according to standard practice, had a tensile strength of 234 pounds per square inch and compression to 60% of its uncompressed volume, under a pressure of 100 pounds per square inch. This compares very favorably with a maximum tensile strength of about 150 lbs. per square inch which is secured with known cork binder. In my improved cork sheet, there is a volume recovery of 94%, when the pressure is removed. Due to the high tensile strengths, I prefer to make sheets or other bodies of the higher density, corresponding to an average weight of 20.2 lbs. per cubic foot.

In each of the formulas stated herein, the binding composition includes a solution of zein in a plasticizing solvent whose boiling point is above 100° C., at normal pressure of 760 mm. of mercury. Said composition also includes a curing compound to which the zein is stable at ordinary temperatures. When said curing compound is heated to a temperature which is below the boiling point of the plasticizing solvent, said curing compound is decomposed or depolymerized, in order to yield a curing agent for the zein. Said curing agent is preferably an aldehyde or analogous to an aldehyde, but the invention is not limited to any particular curing compound or curing agent.

Numerous changes and omissions and additions can be made in the preferred embodiments, without departing from the scope of the invention.

According to my invention, all the zein is cured and the cured zein is uniformly dispersed in the plasticizing solvent.

I do not claim that I have discovered that zein is soluble in various glycols, because this is well-known. However, I claim that I have discovered that a sufficiently concentrated solution of zein in a glycol, in greater concentration than has heretofore been made, has marked advantages in making a binding composition. In the cured compositions made according to Examples 6–8, the cured zein and the respective resin are uniformly distributed throughout the glycol. Whenever I have mentioned a specific substance herein, such substance is to be taken as an example of its general class. For example, I can use various thermoplastic resins, instead of the polyvinyl acetate.

The plasticizing glycols and other solvents which I use, preferably plasticize the cured zein, as well as plasticizing the uncured zein.

Whenever I refer to a solid piece or pieces of material in a claim or claims, such piece or pieces may be of any size or shape, and they can be made of any material or materials.

When I refer in a claim or claims to the use of a glycol as a plasticizing solvent, I include plasticizing derivatives of the glycols, including the ether derivatives, ester derivatives, etc. For example, I refer to "Cellosolve" acetate, which is ethylene glycol monoethyl ether acetate. I also refer to "Cellosolve" which is ethylene glycol monoethyl ether.

I claim:

1. A method of making a coherent and elastic and plasticized body from granules which consist substantially wholly of unplasticized cork, which consists in coating said granules with a substantially anhydrous solution of uncured zein whose solvent is substantially wholly an aliphatic polyhydric alcohol which is a plasticizing solvent for zein and which also is a plasticizer for said cork granules, said cork granules adsorbing said plasticizing solvent, said solution containing an excess of said aliphatic polyhydric alcohol over the amount which is required to plasticize all said zein and to dissolve all said zein at a temperature of substantially 25° C. and at a pressure of 760 mm., said excess of said aliphatic polyhydric alcohol being sufficient to plasticize said cork granules, said coating also containing a substance selected from a class which consists of the polymers and compounds of formaldehyde and the polymers of acetaldehyde, said dissolved and uncured zein being inert to said selected substance and remaining uncured at 25° C., heating said coated granules under pressure to 100° C.–170° C. to decompose said selected substance to evolve enough formaldehyde to cure said zein, said aliphatic alcohol having a boiling point of at least 170° and being sufficiently non-volatile to be substantially wholly retained in said body when said mixture is heated to evolve said formaldehyde.

2. A method according to claim 1, in which said granules are moistened with water prior to coating said granules with said solution.

3. A method according to claim 1, in which said granules are moistened with acidified water prior to coating said granules with said solution.

4. A method according to claim 1, in which said granules are moistened with acidified water prior to coating said granules with said solution and the zein is cured by subjecting the coated and compressed granules to an alternating electrostatic stress.

5. A mass which consists substantially wholly of cork particles which are bound to each other by heat-cured zein, said zein having been subjected to curing while dissolved wholly in substantially anhydrous solvent which is selected from the class of aliphatic polyhydric alcohols whose boiling point is higher than the temperature of heat curing, said cork particles being fully plasticized by said selected solvent.

6. A method according to claim 1, in which said coated granules are heated by subjecting them to a high frequency alternating electrostatic stress.

JOSEF EHRLICH.

REFERENCES CITED

The following references are of record in the file of this patent:

UNITED STATES PATENTS

| Number | Name | Date |
|---|---|---|
| 684,523 | Painter | Oct. 15, 1901 |
| 965,137 | Goldsmith | July 19, 1910 |
| 1,316,854 | Ostenberg | Sept. 23, 1919 |
| 1,660,529 | Schellhaas | Feb. 28, 1928 |
| 1,904,445 | Gray | Apr. 18, 1933 |
| 2,047,961 | Hansen | July 21, 1936 |
| 2,115,240 | Sturken | Apr. 26, 1938 |
| 2,121,844 | Weisenburg | June 28, 1938 |
| 2,134,760 | Chey | Nov. 1, 1938 |
| 2,178,924 | Sturken | Nov. 7, 1939 |
| 2,185,110 | Coleman | Dec. 26, 1939 |
| 2,285,758 | Sturken | June 9, 1942 |
| 2,322,486 | Swallen | June 22, 1943 |

FOREIGN PATENTS

| Number | Country | Date |
|---|---|---|
| 276,318 | Great Britain | Apr. 12, 1928 |
| 436,452 | Great Britain | Oct. 10, 1935 |
| 492,657 | Great Britain | Sept. 19, 1938 |

OTHER REFERENCES

"Handbook of Plastics," by Simons and Ellis, page 343, July 1943.